UNITED STATES PATENT OFFICE.

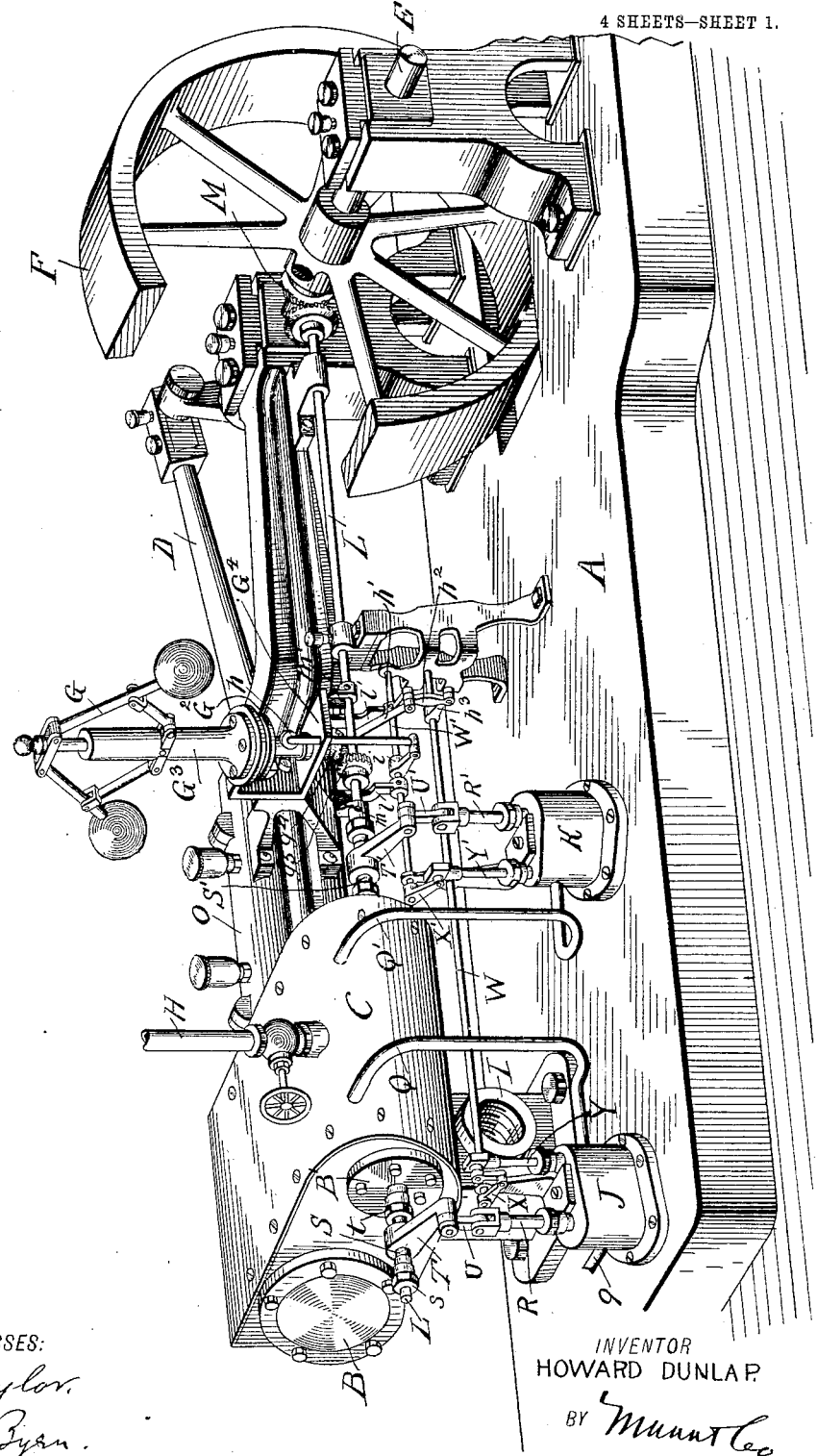

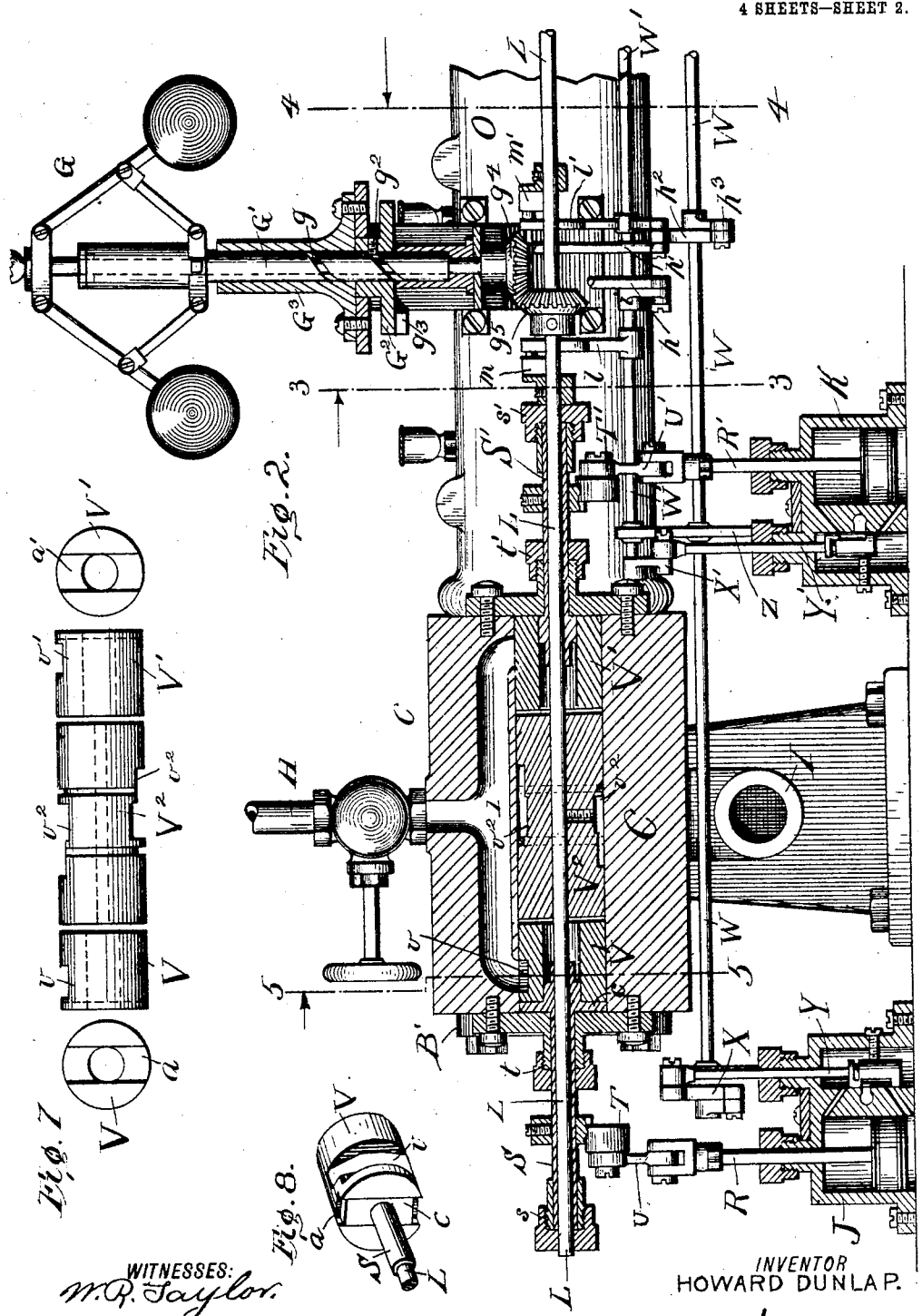

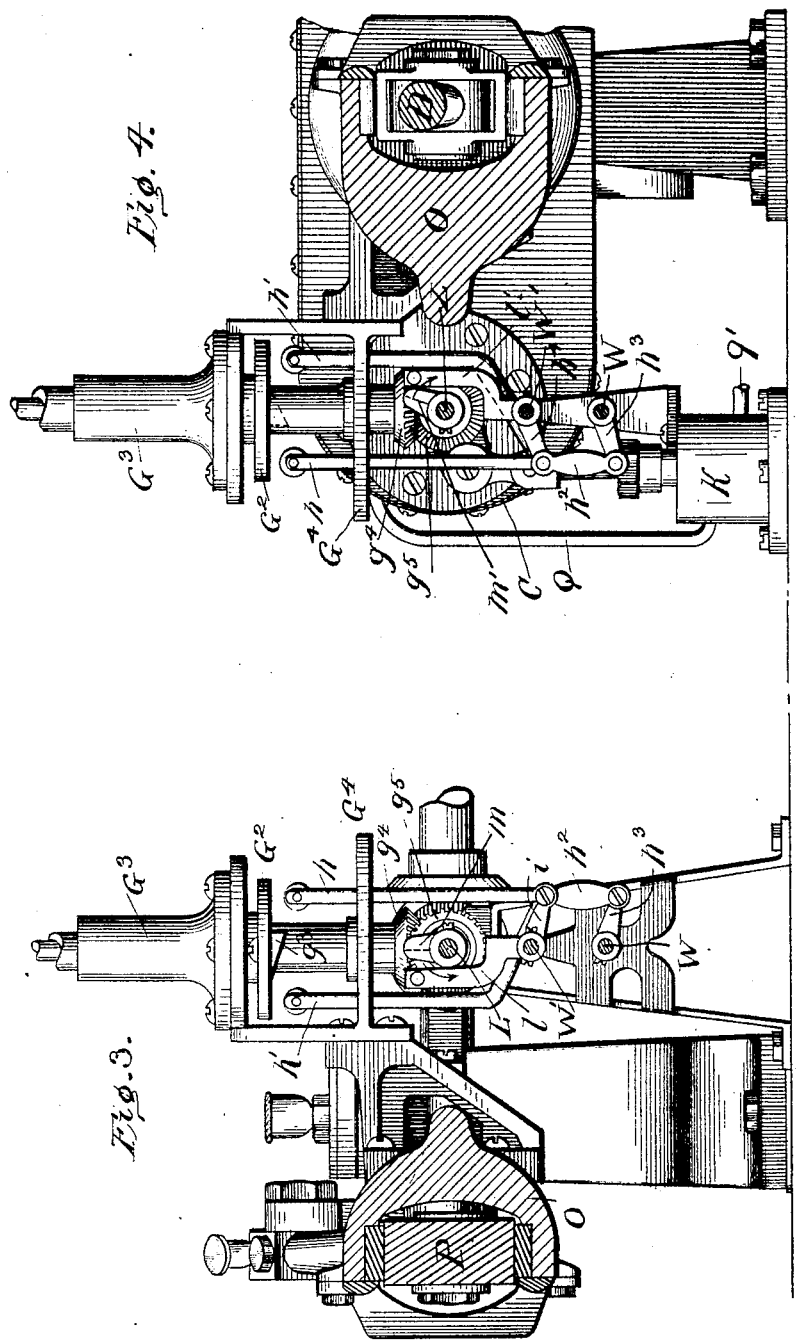

HOWARD DUNLAP, OF MEMPHIS, TENNESSEE, ASSIGNOR OF ONE-HALF TO HENRY H. LESH, OF JACKSON, TENNESSEE.

VALVE-GEAR AND AUTOMATIC CUT-OFF FOR STEAM-ENGINES.

No. 803,409.　　　　　Specification of Letters Patent.　　　　　Patented Oct. 31, 1905.

Application filed June 27, 1905. Serial No. 267,319.

*To all whom it may concern:*

Be it known that I, HOWARD DUNLAP, a citizen of the United States, residing at Memphis, in the county of Shelby and State of Tennessee, have made certain new and useful Improvements in Valve-Gears and Automatic Cut-Offs for Steam-Engines, of which the following is a specification.

My invention is in the nature of a valve-gear and automatic cut-off for steam-engines; and it consists in the novel construction and arrangement of parts operating in conjunction with a rotary valve made in three parts arranged in axial alinement, the middle part of which forms the exhaust-valve and rotates continuously in one direction and the two outer end parts of which form oscillating induction-valves and are operated by separate mechanisms in conjunction with separate coacting cut-off devices, as hereinafter more fully described with reference to the drawings, in which—

Figure 5:
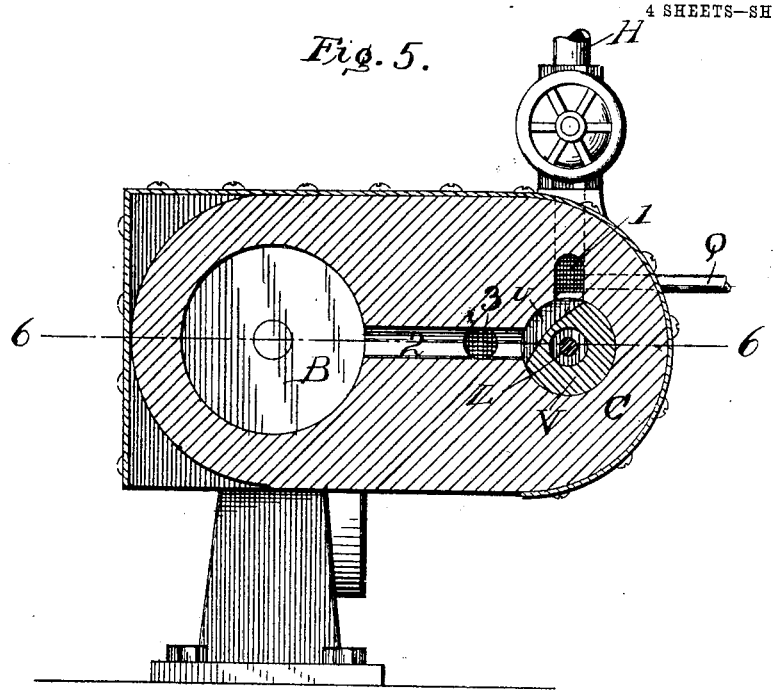
Figure 6:
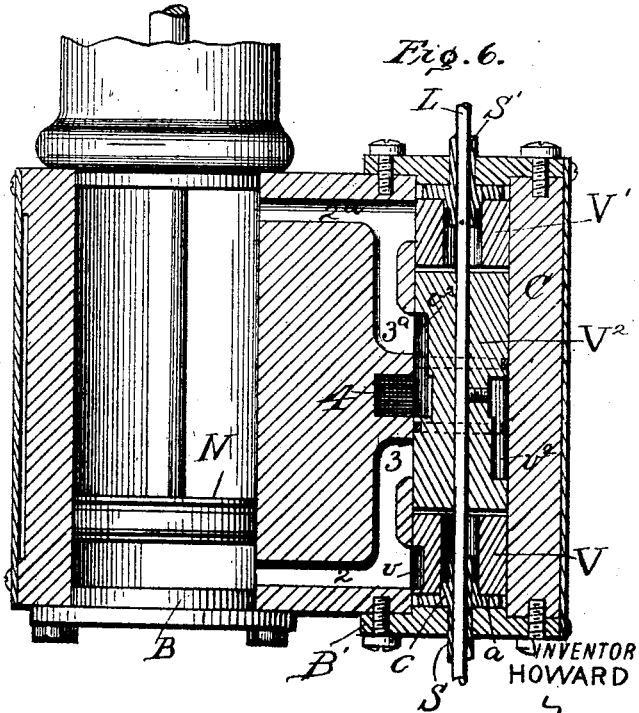

Figure 1 is a perspective view of the entire engine with parts broken away. Fig. 2 is an enlarged vertical longitudinal section through the rotary valve, valve-gear, and automatic cut-off devices. Fig. 3 is a vertical transverse section on line 3 3 of Fig. 2 looking in the direction of the arrow. Fig. 4 is a vertical transverse section on line 4 4 of Fig. 2 looking in the direction of the arrow. Fig. 5 is a vertical transverse section through the rotary valve and cylinder on line 5 5 of Fig. 2 looking in the direction of the arrow. Fig. 6 is a horizontal section through the same parts on line 6 6 of Fig. 5. Fig. 7 represents details showing in side and end views the sectional rotary valve, and Fig. 8 is a further detail in perspective.

Referring to Fig. 1, A is the bed-plate, B the steam-cylinder, and C the steam-chest. D is the connecting-rod, having a cross-head P, Fig. 3, at one end sliding in guideways O and at the other end connecting to a crank on the main shaft E, bearing fly-wheel F. G is the ball-governor, H the inlet steam-pipe provided with a throttle-valve, and I is the exhaust-opening. J and K are two separate small steam-cylinders with pistons and slide-valves, which are separately connected to the two induction-valves to open and close them, and L is a continuously-rotating shaft extending concentrically through the rotary valves in steam-chest C and connected by bevel-gears M to the main shaft E for continuous rotation in one direction. This shaft within the steam-chest passes through and freely revolves within the two induction-valves and is connected to the middle or exhaust section of the rotary valve, so as to continuously rotate said exhaust-valve. This shaft L is also connected by bevel-gears $g^4$ $g^5$ to the ball-governor G, so as to rotate the same.

I will now describe more minutely the rotary valve and the valve-gear by which it is actuated, reference being had more especially to Figs. 2, 5, 6, and 7. V V' $V^2$ are the three sections of the rotary valve, which are made in separate pieces, but are arranged in axial alinement. V and V' are made exactly alike and constitute the two induction-valves, the one admitting steam to one end of the cylinder and the other to the other end. These valves are oscillating valves. They have in their peripheries cut-away portions forming ports $v$ and $v'$, and in its ends (see Fig. 7) they have diametrical cross-slots $a$ and $a'$, which receive corresponding cross-heads, by which they are turned. These valve-sections are centrally bored to allow the central shaft L to pass through, but they are not connected to said shaft, but turn freely thereon. The middle valve-section $V^2$ has upon opposite sides the cut-away portions $v^2$ $v^2$, forming ports which are adapted to span an induction-passage and an exhaust-passage in the steam-chest, the port $v^2$ on one side being a little closer to one end of the valve and the port $v^2$ on the other side being a little closer to the other end of the valve, so that the port on one side will span the exhaust-passage and a passage leading to one end of the cylinder, while the port $v^2$ on the other side will span the exhaust-passage and the passage leading to the other end of the cylinder. This exhaust-section of the valve is rigidly connected to the central shaft L and rotates continuously with it and has packing-rings to make steam-tight joints.

Referring to Figs. 2, 5, and 6, it will be seen that steam entering from the pipe H enters the passage-way 1, which goes to both ends of the cylinder and admits steam to the two induction-valves, which open alternately. The ports $v$ $v'$ of these valves connect the passage-way 1, Fig. 5, with the passage-ways 2 and $2^a$, Fig. 6, leading to opposite ends of the cylinder. The passage-ways 2 and $2^a$ also connect with passage-ways 3 and $3^a$, leading to close proximity on opposite sides of the exhaust passage-way 4. Exhaust passage-way 4 and passage-way $3^a$ are connected by one of the ports $v^2$ of the exhaust-valve, and the exhaust passage-way 4 and the other passage-way 3 are connected by the other port $v^2$ of the exhaust-valve, and as this exhaust-valve rotates it will be seen that its opposite ports $v^2$ $v^2$ alternately open the opposite ends of the cylinder to the exhaust by the continued rotation of the shaft L.

I will now describe the means for oscillating the induction-valves V V' and giving them a cut-off effect. The means for doing this are precisely alike for each induction-valve, one set of means acting on one induction-valve and the other upon the other induction-valve. Referring to the left-hand end of Fig. 2, B' is a head for closing the bore of the valve-chest, and on this head is a stuffing-box $t$. Within this head and stuffing-box there oscillates a sleeve S, which surrounds the central shaft L. This sleeve S on its inner end bears a cross-head $c$, Fig. 8, which drops into the diametrical groove $a$, Fig. 7, of the valve-section V, so as to engage it for rotary turning. The sleeve S at its outer end has a stuffing-box $s$ where the central shaft L emerges therefrom. This sleeve S is rocked to turn the induction-valve by a crank T, rigid on the sleeve, a link U and a piston-rod R terminating in a piston in the cylinder J. This piston is actuated by an ordinary slide-valve through valve-rod Y and crank X on a horizontal rock-shaft W. Another rock-shaft W' acts through crank X' and valve-rod Y' to move a slide-valve and actuate the piston in a second cylinder K, and the piston, through rod R', link U', and crank T', oscillates sleeve S' and the other induction-valve V'. The two rock-shafts W and W' are rocked by the revolution of the shaft L, as follows, reference being had to Figs. 2, 3, and 4.

To rock the shaft W', Fig. 3, the shaft L has a rigid arm $m$, which in its revolution strikes a pin on an upwardly-projecting arm $l$, fixed rigidly on shaft W'. To rock the shaft W, Fig. 4, the shaft L has a rigid arm $m'$, which in its revolution strikes a pin on the upper end of an elbow-lever $l'$, which is fulcrumed on the shaft W' and at its outer end is connected by a link $h^2$ with an arm $h^3$ on the shaft W.

The two shafts W and W' are arranged to be rocked alternately, and when so rocked they alternately operate the two steam-pistons in cylinders J and K, and so alternately oscillate the induction-valves.

Steam is taken to the two supplemental cylinders J and K by steam-pipes Q Q', tapped into the steam-chest, and is exhausted through pipes $q$ and $q'$, Figs. 1 and 4.

I will now describe how the induction-valves are operated with an automatic cut-off effect.

When an induction-valve is opened by the rocking of a shaft W or W' and the consequent admission of steam to one or the other of the valve-operating cylinders J or K, this open position is maintained as long as the slide-valves of rods Y or Y' remain undisturbed; but when one of said valve-rods is shifted steam is exhausted from the cylinders J or K and the return movement of the piston rocks the induction-valve back to close it. This closing movement of the induction-valves is effected through the governor and at a sooner or later period of cut-off, as follows, reference being had to Fig. 2.

The governor-balls are attached to a vertically-sliding shaft G', housed within a hollow pillar $G^3$. The shaft G' has a spiral groove $g$, which receives a pin $g^2$, fixed in a horizontal and rotary adjustable plate $G^2$, so that as shaft G' rises and falls the horizontal plate $G^2$ is turned about a vertical axis. On the lower side of this plate is a cut-off cam $g^3$, which as it revolves is made to act upon the tops of the vertical push-bars $h$ and $h'$, Figs. 1, 3, and 4. These push-bars slide through guide-holes in stationary plate $G^4$ and are connected as follows: bar $h$ to crank-arm $i$ on the shaft W' and bar $h'$, whose lower end is offset, is connected to the link $h^2$ and crank $h^3$ of shaft W, so that the rocking back of these two shafts is successively effected by the depression of the push-bars $h$ $h'$ to cut off steam. Now if the speed of the engine becomes excessive from throwing off the load the governor-balls rise, and turning the plate $G^2$, cause the cut-off cam $g^3$ to act sooner on the push-bars $h$ $h'$ to cut off steam at an earlier period in the stroke of the main piston, and, conversely, if the governor-balls fall from a slower speed, due to excessive tax on the engine, this cut-off cam $g^3$ is turned backward and the induction-valves are held open for a longer period in the stroke of the piston.

In pointing out the advantages of my invention I would call attention to the fact that the cut-off action is positive and of large range. There are no trips which get out of order on account of wear. The engine starts each stroke with a full head of steam. The engine will run successfully at any speed from four hundred revolutions a minute down to the slowest speed.

Having thus described my invention, what I claim as new, and desire to secure by Letters Patent, is—

1. An engine valve-gear, comprising a rotary valve made in three detached and axially-alined sections, the middle section having exhaust-ports and the outer section induction-ports, means for continuously rotating the middle exhaust-section and means for alternately oscillating the outer or induction sections.

2. An engine valve-gear, comprising a rotary valve made in three detached and axially-alined sections, the middle section having exhaust-ports and the outer sections induction-ports, means for continuously rotating the middle exhaust-section, means for alternately oscillating the outer or induction sections and means for rocking back the induction-valves for a cut-off action.

3. An engine valve-gear, comprising a rotary valve made in three detached and axially-alined sections, the middle section having exhaust-ports and the outer sections induction-ports, means for continuously rotating the middle exhaust-section, means for alternately oscillating the outer or induction sections, means for rocking back the induction-valves for a cut-off action, and an automatic governor for timing the rocking-back movement of the induction-valves in proportion to and by the variation in speed.

4. An engine valve-gear, comprising a rotary valve made in three detached and axially-alined sections, the middle section having exhaust-ports and the outer sections induction-ports, a continuously-rotating shaft passing through the valve-sections and connected to and rotating the exhaust-section, a sleeve at each end of the valve arranged concentric to and inclosing said central valve-shaft and coupled to each induction-valve section and means for oscillating said sleeves alternately.

5. An engine valve-gear, comprising a rotary valve made in three detached and axially-alined sections, the middle section having exhaust-ports and the outer sections induction-ports, a continuously-rotating shaft passing centrally through the valve-sections and connected to and rotating the exhaust-section, a sleeve at each end of the valve arranged concentric to and inclosing said central shaft and coupled to each induction-valve section, and means for oscillating said sleeves alternately, said means consisting of a supplementary steam-piston, cylinder, and valve for each sleeve, and means for actuating said parts of the engine.

6. An engine valve-gear comprising a rotary valve, made in three detached and axially-alined sections, the middle section having exhaust-ports and the outer sections induction-ports, a continuously-rotating shaft passing centrally through the valve-sections and connected to and rotating the exhaust-section, a sleeve at each end of the valve arranged concentric to and inclosing said central shaft and coupled to each induction-valve section, means for oscillating said sleeves alternately, said means consisting of two sets of supplementary steam-pistons, cylinders and valves, the last-named valves being connected to and operated by the continuously-rotating shaft of the rotary valve.

7. An engine valve-gear, comprising a rotary valve made in three detached and axially-alined sections, the middle section having exhaust-ports and the outer sections induction-ports, a continuously-rotating shaft passing centrally through the valve-sections and connected to and rotating the exhaust-sections, a sleeve at each end of the valve arranged concentric to and inclosing said central shaft and coupled to each induction-valve section, means for oscillating said sleeves alternately, said means consisting of supplementary steam-engines, two rock-shafts and connecting mechanism for operating the valves of said supplementary engines, and means for alternately rocking these shafts from the continuously-rotating central valve-shaft.

8. An engine valve-gear, comprising a rotary valve made in three detached and axially-alined sections, the middle section having exhaust-ports and the outer sections induction-ports, a continuously-rotating shaft passing centrally through the valve-sections and connected to and rotating the exhaust-section, a sleeve at each end of the valve arranged concentric to and inclosing said central shaft and coupled to each induction-valve section, means for oscillating said sleeves alternately, said means consisting of supplementary steam-engines, two rock-shafts and connecting mechanism for operating the valves of said supplementary engines, means for alternately rocking forwardly these rock-shafts from the continuously-rotating central valve-shaft, mechanism for rocking backwardly these rock-shafts, and an automatic cut-off governor controlling this backward-rocking mechanism.

9. An engine valve-gear, comprising two induction-valves, two supplementary engines for operating the same, two rock-shafts controlling the valves of these supplementary engines, two vertically-moving thrust-bars operating at their lower ends on the two rock-shafts, a horizontally-rotating plate with a pendent cut-off cam acting upon the upper ends of the thrust-bars, and a centrifugal governor connected to said cut-off plate to rotate it by the centrifugal movement of the weight to automatically adjust the time of the cut-off to the speed.

10. An engine valve-gear, comprising a rotary valve made in three detached and axially-alined sections, a central shaft passing through these sections and rotating the middle one, oscillating sleeves for rocking the end sections, supplementary engines for oscillating the sleeves, two rock-shafts controlling the valves of the supplementary engine, means for rocking these shafts from the central valve-shaft, an automatic governor, a pair of bevel-gears connecting the central valve-shaft to the governor and a pair of bevel-gears connecting the central valve-shaft to the main shaft.

HOWARD DUNLAP.

Witnesses:
CHAS. LINDMON,
JAMES C. TAYLOR.